United States Patent [19]

Kusen

[11] Patent Number: 5,645,667
[45] Date of Patent: Jul. 8, 1997

[54] METHOD FOR APPLYING A VISCOUS MATERIAL EDGE STRIP TO A CORNER AREA SURFACE

[75] Inventor: Michael Kusen, Bremen, Germany

[73] Assignee: Mercedes-Benz AG, Germany

[21] Appl. No.: 595,790

[22] Filed: Feb. 2, 1996

[30] Foreign Application Priority Data

Feb. 16, 1995 [DE] Germany .......... 195 05 162.945

[51] Int. Cl.$^6$ .......................................... B29C 47/06
[52] U.S. Cl. ................... 156/108; 156/244.25; 264/252; 427/358; 425/150
[58] Field of Search .......... 156/107, 108, 156/109, 244.11, 244.25, 578; 264/252; 427/284, 358; 118/111, 240; 425/150

[56] References Cited

U.S. PATENT DOCUMENTS

| 5,108,526 | 4/1992 | Cornils et al. ............. 156/108 |
| 5,362,428 | 11/1994 | Tsujino et al. ............. 156/244.11 |
| 5,382,395 | 1/1995 | Hoenke . | |

FOREIGN PATENT DOCUMENTS

| 0 444 998 A1 | 2/1991 | European Pat. Off. . |
| 0 568 014 A1 | 11/1993 | European Pat. Off. . |
| 0 672 513 A1 | 9/1995 | European Pat. Off. . |
| 37 30 344 A1 | 3/1989 | Germany . |
| 39 37 381 A1 | 5/1991 | Germany . |
| 40 34 291 A1 | 4/1992 | Germany . |
| 43 26 179 A1 | 2/1994 | Germany . |
| 59-199079 | 3/1985 | Japan . |
| 1-184076 | 9/1989 | Japan . |

*Primary Examiner*—Michael W. Ball
*Assistant Examiner*—Michael A. Tolin
*Attorney, Agent, or Firm*—Evenson, McKeown, Edwards & Lenahan, P.L.L.C.

[57] ABSTRACT

A method is utilized in which, when approaching the corner, a nozzle is rotated from a position with a nozzle slot positioned essentially transversely with respect to the longitudinal direction of the edge strip section in the direction of a position with a nozzle slot positioned in parallel to the median line of the corner area and, during the subsequent removal from the corner, continuously in the direction of a position with a nozzle slot positioned essentially transversely to the longitudinal direction of the present edge strip section. As a result, an edge strip, which has no interruptions and is acute-angled in the corner areas conforming to the surface, can be applied in one operation. The method can be employed, for example, in applying an adhesive bead to a vehicle window pane to be glued into a vehicle body opening.

4 Claims, 1 Drawing Sheet

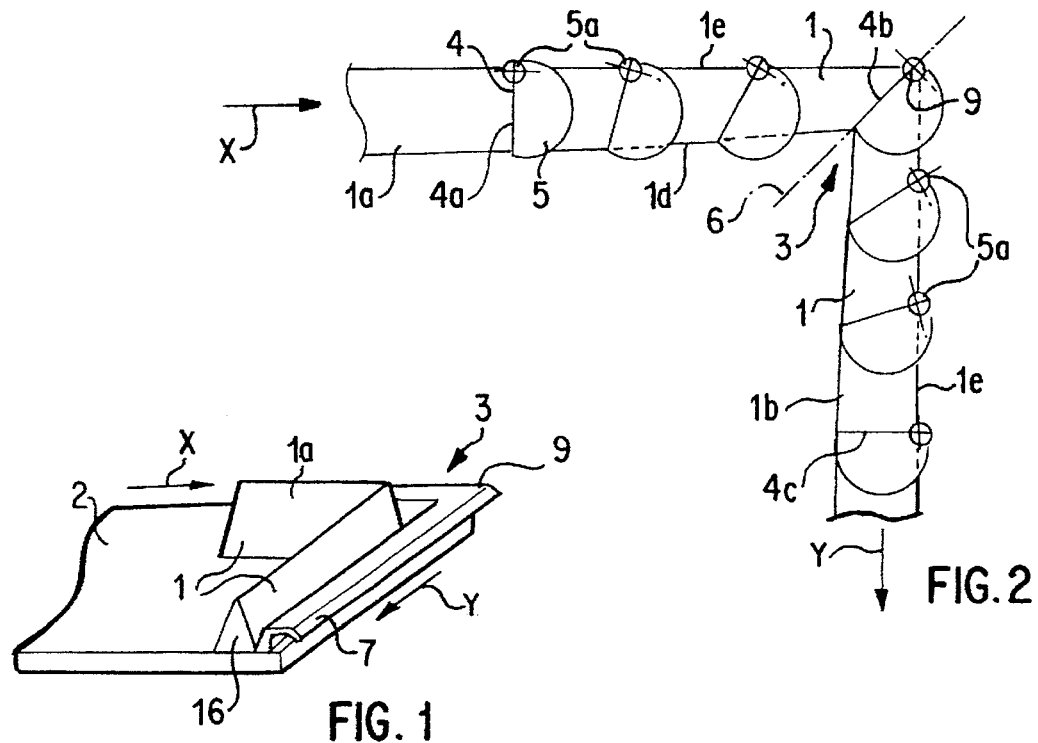
FIG. 1
FIG. 2
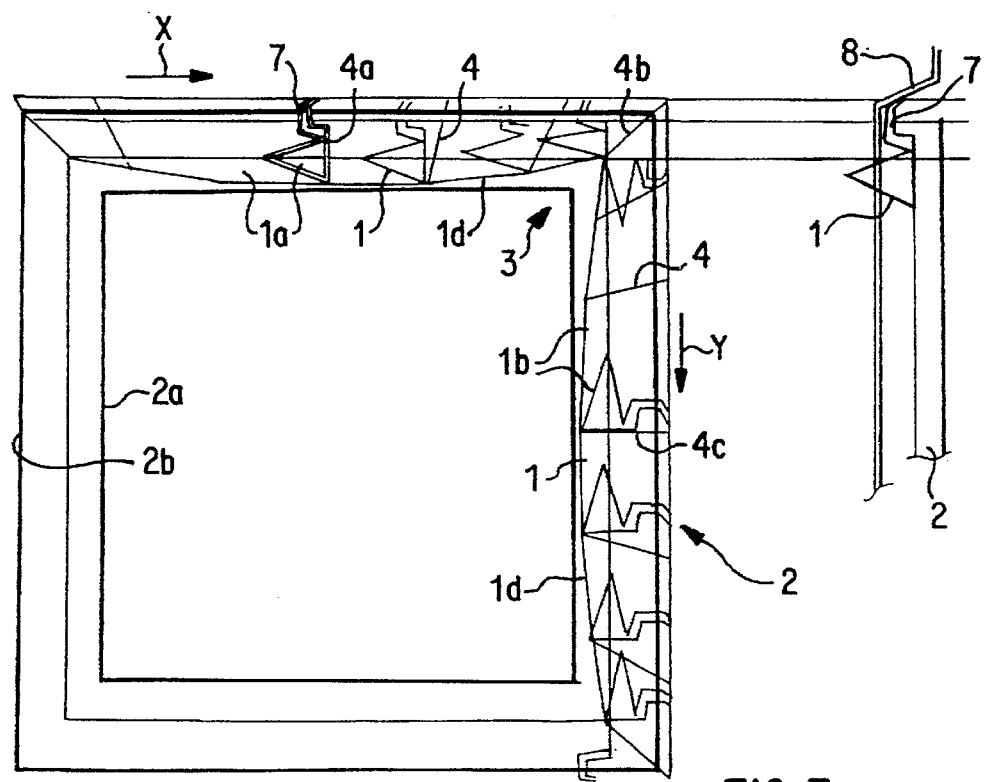
FIG. 3

METHOD FOR APPLYING A VISCOUS MATERIAL EDGE STRIP TO A CORNER AREA SURFACE

BACKGROUND AND SUMMARY OF THE INVENTION

The present invention relates to a method for applying an edge strip made of a viscous material to a surface which has at least one corner area, and more particularly, to a method for applying an adhesive bead to a vehicle window pane in which the material is discharged from a slot-shaped nozzle without interruptions also over the corner area and the nozzle being guided in a relative movement over the surface.

A known method, for example, applies an adhesive bead having a preferably triangular cross-section to a window pane along its edge. After the application of the adhesive bead, which may, for example, consist of an adhesive polyurethane material, the pane may then be glued into a pertaining vehicle body opening in either a mechanized or a manual manner. In such a conventional method, the adhesive bead is therefore applied without interruptions over the corner area of the surface to be provided with the edge strip as a result of the fact that the nozzle is guided along a circular arc of a small radius over this corner area as described in DE 37 30 344 A1. It was found, however, that in certain applications, the desired shape and/or uniformity of the adhesive bead can no longer be ensured if the curvature radius of the nozzle path becomes too small. With this known technique, it is therefore not possible to achieve an adhesive bead of a homogeneous cross-sectional shape and sharp edges.

The same is also true with regard to a known method for applying a spacer bead of a defined cross-section to a vehicle window pane disclosed in German Patent Document DE 43 26 179 A1. In order to apply the spacer bead with an angular course conforming to a respective corner area while maintaining the desired cross-section, it was suggested to apply the spacer bead sections adjoining the respective corner area so that they overlap in the corner area after which, by way of a press molding tool, which is provided particularly for this purpose, the thickened overlapping area is brought into the desired corner shape.

In DE 40 34 291 A1, a method is disclosed for applying a medium to a flat body via a robot in which a movement of the flat body by the robot and a rotating movement of the nozzle are coordinated with one another such that a moving sequence for the robot is obtained which is as simple as possible. There, for example, for applying an edge-side adhesive bead of a triangular cross-section to a vehicle window pane, the pane, during the application of the adhesive bead along one side of the pane, is subjected by the robot to a combined translational and rotational movement while simultaneously the nozzle is rotated such that the nozzle slot remains positioned transversely to the longitudinal direction of the adhesive bead strip to be applied.

In the method described in JP 1-184076 (A), an edge strip made of a viscous material is applied discontinuously in a surface corner area by a robot arm in that, when the corner is reached, the discharging of the material is stopped. The robot arm in a loop changes its moving direction parallel to the direction of the edge strip section to be applied next, and, when the corner is reached again, discharging of the material is continued.

In the method of JP 59-199079 (A), an edge-side adhesive bead is applied to the bottom side of a surface body by a nozzle which moves around the circumferential side of the surface body and leads out on the bottom side of the surface body.

DE 39 37 381 shows a device for the controlled application of linearly extending strands of pasty masses to a substrate in which case, simultaneously with the bead application, a visual degree-of-luminosity measurement is carried out at a point in advance of the application point and at a point following the application point. From a specific difference of the degree of luminosity of the two measuring points, a conclusion is drawn with respect to a sufficient thickness of the bead application, predominantly for a controlled application of a luminous solder paste to dull printed circuit boards. On the one hand, the known application control can be used only for pairings of a substrate and an application medium which, with respect to their luminosity, clearly differ from one another. For approximately equally luminous substrates or application media, or for beads of a defined shape and with a strongly dispersive reflex effect which are customary in the automobile industry, the known control cannot be used. Furthermore, this literature contains no suggestions as to how an adhesive bead can efficiently be applied in a manner corresponding to the shape along a track which bends in a sharp-edged fashion. An examination of the presence or absence of a bead application can, however, logically not provide information with respect to the production of a specific bead cross-section under difficult geometrical application conditions.

The present invention has an object of providing a method in which an interruption-free edge strip can be achieved at comparatively low expenditures with a course conforming to that of the surface edge also in a corner area of the surface edge.

This object has been achieved by a method in which (a) the material is discharged from a slot-shaped nozzle without interruptions also over the corner area, (b) the nozzle is guided in a relative movement over the surface, (c) when approaching a corner at the corner area the nozzle is rotated continuously from a position with a nozzle slot positioned essentially transversely with respect to a longitudinal direction (x) of a first applied edge strip section in the direction of a position with the nozzle slot positioned in parallel to a median line of the corner area and, during subsequent removal from the corner, continuously in the direction of a position with a nozzle slot positioned essentially transversely to a second longitudinal direction of a second applied edge strip section.

For applying the edge strip over a corner area, while the discharge of material is continued without interruption, the nozzle, when approaching the corner, is continuously rotated such that the nozzle outlet slot, which is normally situated transversely to the longitudinal direction of the edge strip to be applied, is continuously tilted such that it encloses an increasingly smaller acute angle with the median line of the corner area. When reaching the corner, the nozzle slot is preferably situated parallel to this median line. From the position reached in the corner, during the subsequent removal, the nozzle is continuously rotated further out of the corner, preferably until the nozzle slot is again situated transversely to the new longitudinal direction of the momentarily applied edge strip section.

Although, with the method of the present invention, the width of the applied edge strip is reduced toward one corner, this is not critical in most cases. As a result of saving process steps and a special tool for the shaping of the edge strip in corner areas, the method can be carried out in a very low-cost manner compared with the initially mentioned conventional methods while the quality of the edge strip is high.

An important use of the method of the present invention is the application of an adhesive bead of a triangular cross-section along the edge of a window pane. The new method allows the adhesive bead application in one operation possibly simultaneously with a spraying around of the sealing profile, in which case, while the triangular adhesive bead cross-section is maintained, a sharp-edged adhesive bead course which conforms with the pane edge can be achieved in the pane corner areas.

Because an important aspect is a relative movement between the nozzle and the surface provided with the edge strip, it is insignificant with respect to the sequence of movements whether only the nozzle, only the surface or both parts are caused to move.

A further advantageous aspect of the present invention involves applications in which the nozzle clearly has a lower weight than the body to which the edge strip is applied because then, for example, the robot-guided nozzle can follow the path of movements over a sharp-edged corner area much more steadily than the heavier body.

Preferred kinematics of the relative movement between the nozzle and the surface over a corner area are achieved in accordance with the present invention in that the nozzle is rotated about a point which is situated at the level of the exterior side of the edge strip to be applied. In a corner area with linear surface edges, the edge strip can then be applied over the corner area by this nozzle rotating movement combined with a translational movement along the surface edges. The direction of the transverse movement is changed from the direction parallel to one surface edge to the direction in parallel to the other surface edge as soon as the nozzle has reached the corner.

BRIEF DESCRIPTION OF THE DRAWINGS

These and other objects, features and advantages of the present invention will become readily apparent from the following detailed descriptions thereof when taken in conjunction with the accompanying drawings wherein:

FIG. 1 is a partial perspective view of a vehicle window pane in a corner area with an adhesive bead applied on the edge side and a spraying around of the sealing profile;

FIG. 2 is a schematic top view of the nozzle moving path used for producing the adhesive bead of FIG. 1; and FIG. 3 is an overall plan view of the pane of FIG. 1 with edge-side sectional representations and a cut-out, sectional side view of the pane inserted into a body sheet metal opening.

DETAILED DESCRIPTION OF THE DRAWINGS

The perspective partial view of FIG. 1 illustrates a vehicle pane to which an edge strip is applied as a triangular cross-section adhesive bead 1 made of adhesive polyurethane material. The pane 2 is also provided with a rubber sealing profile 7 which extends around outside the adhesive bead 1 and projects beyond the pane edge. The bordering consisting of the rubber sealing profile 7 as well as the adhesive bead 1 are applied in one operation by a nozzle application method, in which the application of the adhesive bead 1 will be described in detail below.

As illustrated in FIG. 1, which illustrates a corner area 3 of the pane 2, the course of the adhesive bead 1 conforms with the angular course of the pane edge in an also sharply bent shape with two edge strip sections 1a, 1b which are perpendicular with respect to one another and extend on one side respectively of the corner area 3. This shape of the adhesive bead 1 can be achieved by a special relative movement of the nozzle body 5 used for the discharge of the adhesive bead material having a slot-shaped nozzle outlet 4 with respect to the pane 2, as illustrated more precisely in FIG. 2.

The relative movement of the schematically illustrated nozzle 4, 5, illustrated in FIG. 2, with respect to the pane 2, indicates that the nozzle body 5 with the nozzle outlet slot 4 for applying the adhesive bead 1 in the shown corner area 3 moves first in the longitudinal direction (x) of the first applied adhesive bead section 1a until the corner 9 is reached. There the transverse nozzle advance is redirected in that the previous transverse movement in the x-direction is stopped and the nozzle body 5 is now accelerated in the longitudinal direction (y) of the subsequently applied adhesive bead section 1b. A rotating movement of the nozzle body 5 is superimposed on this transverse bending movement of the nozzle body 5, in which the point of rotation 5a is situated on the extreme end of the nozzle slot 4. Before approaching the corner area 3, the nozzle 5 is positioned in the customary manner with the nozzle slot extending transversely to the longitudinal direction (x) of the adhesive bead 1 to be applied, as designated by reference numeral 4a. When a specific, preselectable distance to the corner 9 is reached, as can be readily determined now, the rotating movement about the point of rotation 5a will start, the axis of rotation being situated perpendicularly to the plane of the drawing, that is, to the longitudinal course of the nozzle slot 4 and perpendicularly to the longitudinal direction (x) of the adhesive bead 1. The rotating direction is selected such that the nozzle slot 4 tilts continuously in the direction parallel to the median line 6 of the corner 9, the rotating point 5a being taken along with the transverse movement component of the nozzle body 5. The uniform rotating movement, which is superimposed on the transverse movement of the nozzle body 5 when approaching the corner 9 takes place such that the nozzle slot longitudinal direction 4b is situated on the median line of the corner area 3 when the nozzle body 5 has reached the corner 9 and the transverse movement component is redirected from the x-direction into the y-direction. When leaving the corner 9, the rotating movement of the nozzle body 5 in the counterclockwise direction is continued until the nozzle 4, 5, at a preset distance to the corner 9, after leaving the corner, has reached a position in which the nozzle slot longitudinal course 4c is again situated transversely to the now new transverse moving direction (y).

The above-described course of the nozzle movement avoids a jerky rotation of the nozzle body 5 in the corner 9 and, in fact, the required 90° rotation is uniformly distributed over the entire corner area. The nozzle slot positions which are shown in FIG. 2 and follow one another have the result that, in the case of an uninterrupted material discharge from the nozzle 4, 5, an adhesive bead 1 is applied which has no interruptions also over the corner area 3 and whose mutually angled bead sections 1a, 1b adjoin one another in a sharply bent manner in the corner 9 without the occurrence of a rounded portion.

As illustrated in FIG. 1, the triangular adhesive bead cross-section can thus also be maintained over the corner area 3. There is only a certain narrowing of the adhesive bead 1 in the vicinity of the corner 9 because there the nozzle outlet slot 4 is no longer situated perpendicularly to the longitudinal direction of the adhesive bead. The reason is that, as a result of the nozzle slot rotation, with a decreasing distance to the corner 9, the interior side 1d of the adhesive bead approaches up to a minimal width of the adhesive bead of the exterior side 1e of the adhesive bead which extends conforming to the pane edge. This presents no difficulties, however, because, on one hand, the adhesive bead 1 is, for the most part, situated behind a blackened pane area as described below and, on the other hand, the entire pane system with respect to stability can easily be configured with respect to this narrower adhesive bead width in the corner areas.

FIG. 3 illustrates the entire, approximately square and essentially planar pane 2, in which case, on two sides thereof, the applied adhesive bead 1 of FIG. 1 is illustrated in sectional views with its pertaining sections 1a, 1b and the rubber sealing profile 7 projecting beyond the exterior edge 2b of the pane. This view demonstrates the slightly curved course of the interior side 1d of the adhesive bead on a respective pane side by the tilting of the nozzle outlet slot 4 from its transverse position 4a, 4c into the position 4b (FIG. 2) which, in each case, is parallel to the median line 6 of each corner area 3. The triangular adhesive bead cross-section is also shown which is maintained along the entire pane edge and which decreases in its width only toward the corner areas 3. The entire adhesive bead 1 is situated within a window pane frame blackened by ceramic screen printing. The pane frame extends from the exterior edge 2b of the pane to an interior edge 2a of the pane defining the transparent pane surface.

By the full rotational movement of the nozzle 4,5 in the respective transverse directions (x, y, −x, −y), the adhesive bead can be applied continuously in one operation with sharply angled corners which conform with the pane 2. In comparison to the conventional technique for achieving acute adhesive bead corners, in which an additional pressing tool is used, a considerable saving of time and costs results. The continuous application of the adhesive bead in the corner areas avoids high-expenditure setting and finishing problems. The achievement of such acute-angled adhesive bead corners is not possible in a satisfactory manner with a nozzle which is guided around the corner in a known circular-arc-shaped fashion because, in the case of curvature radii smaller than approximately 30 mm, tilting, cracks and/or diagonal positions of the adhesive bead occur.

The sectional representation shown on the right side in FIG. 3 illustrates a cut-out of a sectional view of the height of the center of the upper pane side parallel to the nozzle slot direction 4a shown there after the gluing of the pane into an opening of a vehicle body wall 8 while using the adhesive bead 1. In this case, the rubber sealing profile 7 presses sealingly against the vehicle body opening edge.

The relative movement between the nozzle 5 with the nozzle slot 4 and the pane 2 required for applying the adhesive bead 1 may be implemented in a selected manner appropriate to the respective use. Frequently, for example, the pane 2 will be considerably heavier than the nozzle body 5. In these cases, it is preferred to hold the pane 2 in a stationary manner and move the nozzle 5 via a robot or a portal control in the manner explained in FIG. 2.

The above example shows the advantages of the method according to the present invention, in which case additional implementations of the process are within the contemplation of the present invention. Thus, the sequence of movements may be modified such that the nozzle slot is not situated precisely parallel to the median line 6 when the nozzle is located in the corner. In addition, a different position of the center of rotation may be selected as long as it is ensured that, when the nozzle approaches the corner, the nozzle slot 4 rotates in the direction of the position of the median line 6. By, of course, a corresponding modification of the sequence of movements, the application of such an edge strip is possible, not only over the illustrated rectangular corner area but, along corner areas with arbitrary corner angles.

It is further understood that the method of the present invention is suitable, not only for the application of an adhesive bead for a vehicle pane but also, for the application of an arbitrary edge strip made of a viscous material to a surface, for example, in airplane construction, in window construction and in the furniture industry.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A method for applying an edge strip made of a viscous material to a surface with a corner area, comprising the steps of (a) discharging the material from a slot-shaped nozzle without interruptions over the corner area, (b) guiding the nozzle with relative movement over the surface, and (c) when approaching a corner at the corner area, rotating the nozzle continuously from a position with a nozzle slot positioned essentially transversely with respect to a longitudinal direction of a first applied edge strip section in the direction of a position with the nozzle slot positioned in parallel to a median line of the corner area and, during subsequent removal from the corner, continuously in the direction of a position with a nozzle slot positioned essentially transversely to a second longitudinal direction of a second applied edge strip section.

2. The method according to claim 1, wherein the surface is held stationary and the nozzle is moved relative thereto.

3. The method according to claim 1, wherein a point of rotation of the nozzle rotating movement during the movement over the corner area is situated on an exterior side of the edge strip.

4. The method according to claim 3, wherein the surface is held stationary and the nozzle is moved relative thereto.

* * * * *